(No Model.) 2 Sheets—Sheet 1.

G. F. STRAWSON.
SEEDER AND FERTILIZER DISTRIBUTER.

No. 441,810. Patented Dec. 2, 1890.

Witnesses

Inventor
G. F. Strawson.
per
Attorney (No Model.) 2 Sheets—Sheet 2.

G. F. STRAWSON.
SEEDER AND FERTILIZER DISTRIBUTER.

No. 441,810. Patented Dec. 2, 1890.

UNITED STATES PATENT OFFICE.

GEORGE FREDERICK STRAWSON, OF NEWBURY, ENGLAND.

SEEDER AND FERTILIZER-DISTRIBUTER.

SPECIFICATION forming part of Letters Patent No. 441,810, dated December 2, 1890.

Application filed January 15, 1890. Serial No. 337,029. (No model.) Patented in Belgium April 30, 1889, No. 85,922; in Canada May 4, 1889, No. 31,259; in Switzerland May 4, 1889, No. 898; in Cape of Good Hope June 1, 1889, No. 66; in Spain June 13, 1889, No. 9,485; in Portugal June 20, 1889, No. 1,367; in Turkey July 10, 1889, No. 416; in Italy July 16, 1889, XXIII, 25,552; in Brazil August 3, 1889, No. 737; in Norway September 4, 1889, No. 1,321; in Victoria September 12, 1889, No. 7,098; in New South Wales September 14, 1889, No. 1,703; in Argentine Republic September 19, 1889, No. 796, and in Denmark October 1, 1889, No. 218.

*To all whom it may concern:*

Be it known that I, GEORGE FREDERICK STRAWSON, a subject of the Queen of Great Britain, residing at Newbury, in the county of Berks, England, have invented new and useful Improvements in Seeders and Fertilizer-Distributers, of which the following is a specification.

My invention, for which Letters Patent have been granted to me in Belgium April 30, 1889, No. 85,922; in Canada May 4, 1889, No. 31,259; in Switzerland (provisional patent) May 4, 1889, No. 898; in Cape of Good Hope June 1, 1889, No. 66; in Spain June 13, 1889, No. 9,485; in Portugal June 20, 1889, No. 1,367; in Turkey July 10, 1889, No. 416; in Italy July 16, 1889, Vol. XXIII, No. 25,552; in Brazil August 3, 1889, No. 737; in Norway September 4, 1889, No. 1,321; in Argentine Republic September 19, 1889, No. 796; in Denmark October 1, 1889, No. 218; in New South Wales September 14, 1889, No. 1,703, and in Victoria September 12, 1889, No. 7,098, relates to improvements on a former invention, for which Letters Patent were granted to me in the United States of America, numbered 411,692, dated September 24, 1889, entitled "improvements in seeders and fertilizer-distributers;" and the object of my invention is to insure a more even distribution of the material being distributed, more particulary when the machine is traveling over sidelong ground. I attain this object by the mechanism illustrated in the accompanying drawings, in which—

Figure 1:
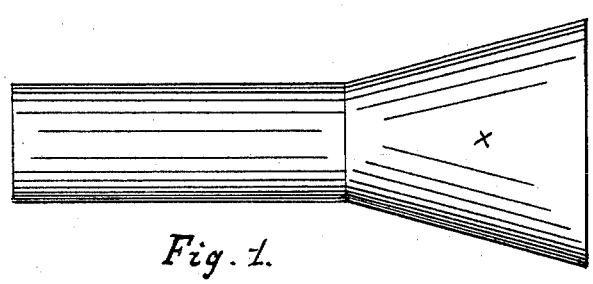
Figure 2:
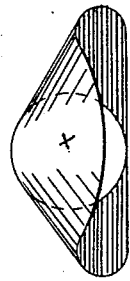
Figure 3:
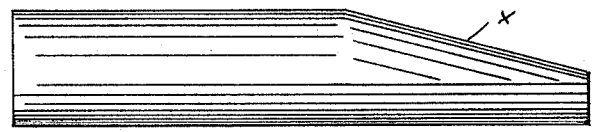
Figure 4:
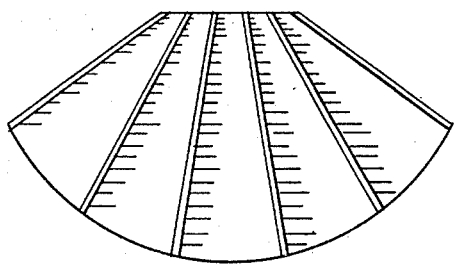
Figure 5:
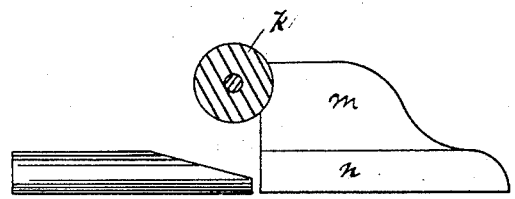
Figure 6:
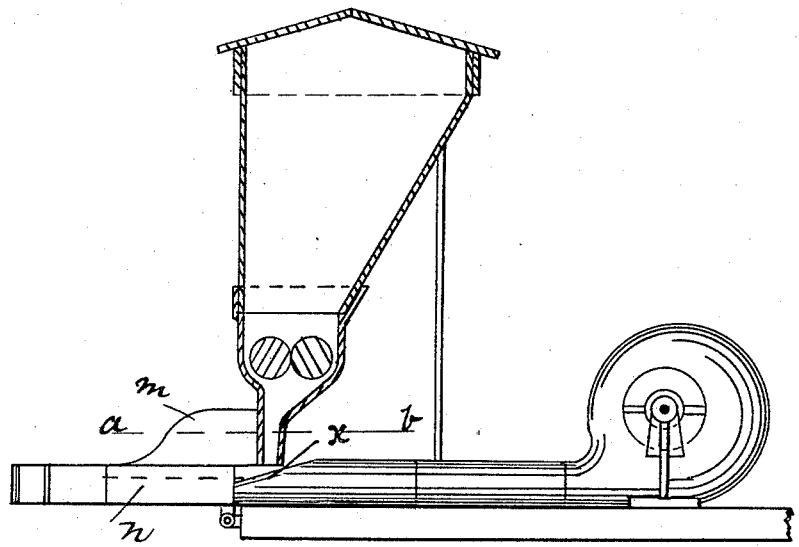
Figure 7:
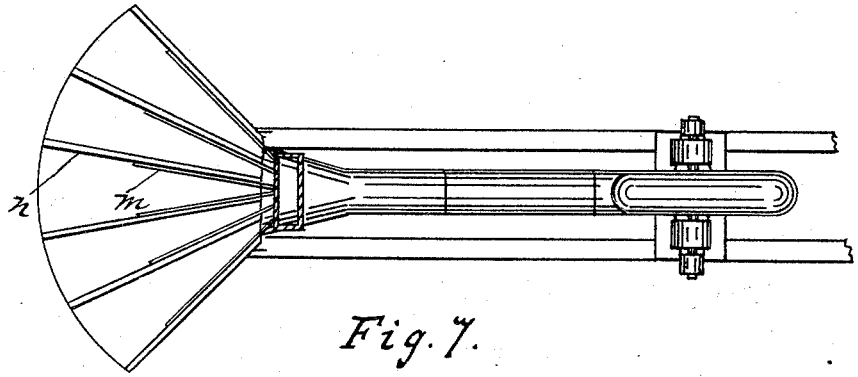

Figures 1, 2, and 3 represent plan and elevation and side elevation, respectively, of improved delivery-nozzle constructed according to my present invention; Fig. 4, a plan of improved delivery-board constructed according to my present invention; Fig. 5, a side view of nozzle and delivery-board in position, drawn to a reduced scale. Fig. 6 shows apparatus attached to a distributing-machine, part only of such machine being shown; Fig. 7, a plan of same.

According to the invention I construct the delivery-nozzle flattened at its outer extremity, as shown in Figs. 1, 2, and 3, and slightly contract the area at the center of the outer orifice (shown in Fig. 3) so as to obtain a greater volume of air-blast at the sides.

The delivery-board I construct as with a series of vertical division-pieces in the direction of the air-blast, as shown in Fig. 4, so as to prevent the material all falling on one side when the machine is traveling over sidelong ground, these division-pieces being carried up to the feed-roller $k$, as shown in Fig. 5. To allow of adjustment of the delivery-board in a vertical plane, I construct the division-pieces in two parts $m$ and $n$, as shown in Fig. 5, the portions $n$ being fastened to the delivery-board and the portions $m$ to any suitable parts of the apparatus. The material is fed onto the inclined portion $x$ of the nozzle and falls from thence onto the delivery-board, where it is caught by the air-blast from the fan or blower and dispersed.

What I claim as my invention, and desire to secure by Letters Patent, is—

In seeders and fertilizer-distributers, the combination, with a flattened delivery-nozzle having its area contracted in the center thereof, of a delivery-board fitted with vertical division-pieces in the direction of the air-current, all substantially as set forth.

GEORGE FREDERICK STRAWSON.

Witnesses:
    FRANK DEVER SUMMERS,
    HENRY MAYKELS,
*Both of 65 and 66 Chancery Lane, London, England, Clerks.*